(12) United States Patent
Hughes (10) Patent No.: US 10,037,647 B1
(45) Date of Patent: Jul. 31, 2018

(54) CHARGER VENDING ASSEMBLY (71) Applicant: Brian Hughes, Woodstock, GA (US)

(72) Inventor: Brian Hughes, Woodstock, GA (US)

( * ) Notice: Subject to any disclaimer, the term of this patent is extended or adjusted under 35 U.S.C. 154(b) by 0 days.

(21) Appl. No.: 15/622,770

(22) Filed: Jun. 14, 2017

(51) Int. Cl.
G06K 7/08 (2006.01)
G07F 17/00 (2006.01)
G07F 11/54 (2006.01)
H02J 7/00 (2006.01)

(52) U.S. Cl.
CPC .......... *G07F 17/0042* (2013.01); *G07F 11/54* (2013.01); *H02J 7/0042* (2013.01)

(58) Field of Classification Search
CPC . G06K 7/08; G06K 5/00; G06K 19/00; G06F 17/00
USPC ................. 235/381, 380, 375, 487
See application file for complete search history.

(56) References Cited

U.S. PATENT DOCUMENTS

| | | | |
|---|---|---|---|
| 5,544,784 A | 8/1996 | Malaspina | |
| 5,651,536 A | 5/1997 | Tseng | |
| 8,355,965 B2 | 1/2013 | Yamada | |
| D692,951 S | 11/2013 | Saario et al. | |
| 9,129,461 B2 | 9/2015 | Luke et al. | |
| 9,203,245 B2 | 12/2015 | Aloe | |
| 9,276,418 B2 | 3/2016 | Kawasaki et al. | |
| 2013/0063073 A1* | 3/2013 | Kawasaki | H02J 7/0027 320/101 |
| 2014/0368156 A1* | 12/2014 | Aloe | H02J 7/0003 320/106 |
| 2015/0137759 A1* | 5/2015 | Palmer | G06Q 30/06 320/112 |
| 2015/0288207 A1* | 10/2015 | Walker, Jr. | H02J 7/0044 320/114 |
| 2016/0180632 A1* | 6/2016 | Santana | H02J 7/0027 700/238 |
| 2016/0300424 A1* | 10/2016 | Jones | G07F 15/006 |

FOREIGN PATENT DOCUMENTS

| | | | |
|---|---|---|---|
| CN | 202838522 U | * | 3/2013 |
| WO | WO 2016153238 | | 9/2016 |

* cited by examiner

Primary Examiner — Edwyn Labaze (57) ABSTRACT

A charger vending assembly includes a housing that may be positioned on a support surface. A vending unit is movably positioned within the housing and the vending unit contains a plurality of chargers. The vending unit selectively dispenses a selected number of the chargers outwardly from the housing. In this way the selected number of chargers may be used to charge an electronic device. A control unit is coupled to the housing and the control unit is selectively manipulated. The control unit is electrically coupled to the vending unit such that the control unit controls operational parameters of the vending unit. The vending unit dispenses the selected chargers in accordance with commands from the control unit.

15 Claims, 6 Drawing Sheets

CHARGER VENDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to vending devices and more particularly pertains to a new vending device for renting a portable charger to charge an electronic device.

BRIEF SUMMARY OF THE INVENTION

An embodiment of the disclosure meets the needs presented above by generally comprising a housing that may be positioned on a support surface. A vending unit is movably positioned within the housing and the vending unit contains a plurality of chargers. The vending unit selectively dispenses a selected number of the chargers outwardly from the housing. In this way the selected number of chargers may be used to charge an electronic device. A control unit is coupled to the housing and the control unit is selectively manipulated. The control unit is electrically coupled to the vending unit such that the control unit controls operational parameters of the vending unit. The vending unit dispenses the selected chargers in accordance with commands from the control unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
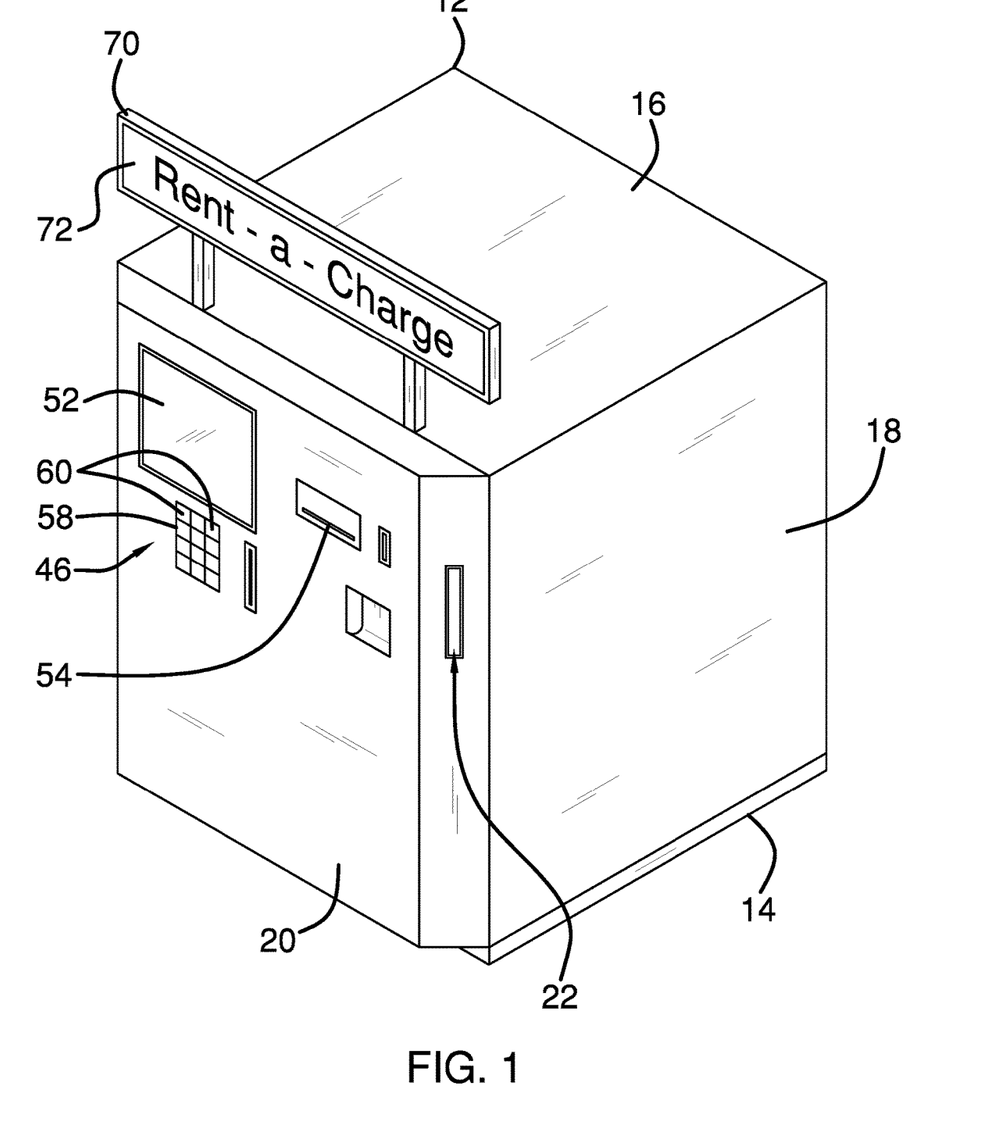
FIG. 1 is a front perspective view of a charger vending assembly according to an embodiment of the disclosure.
Figure 2:
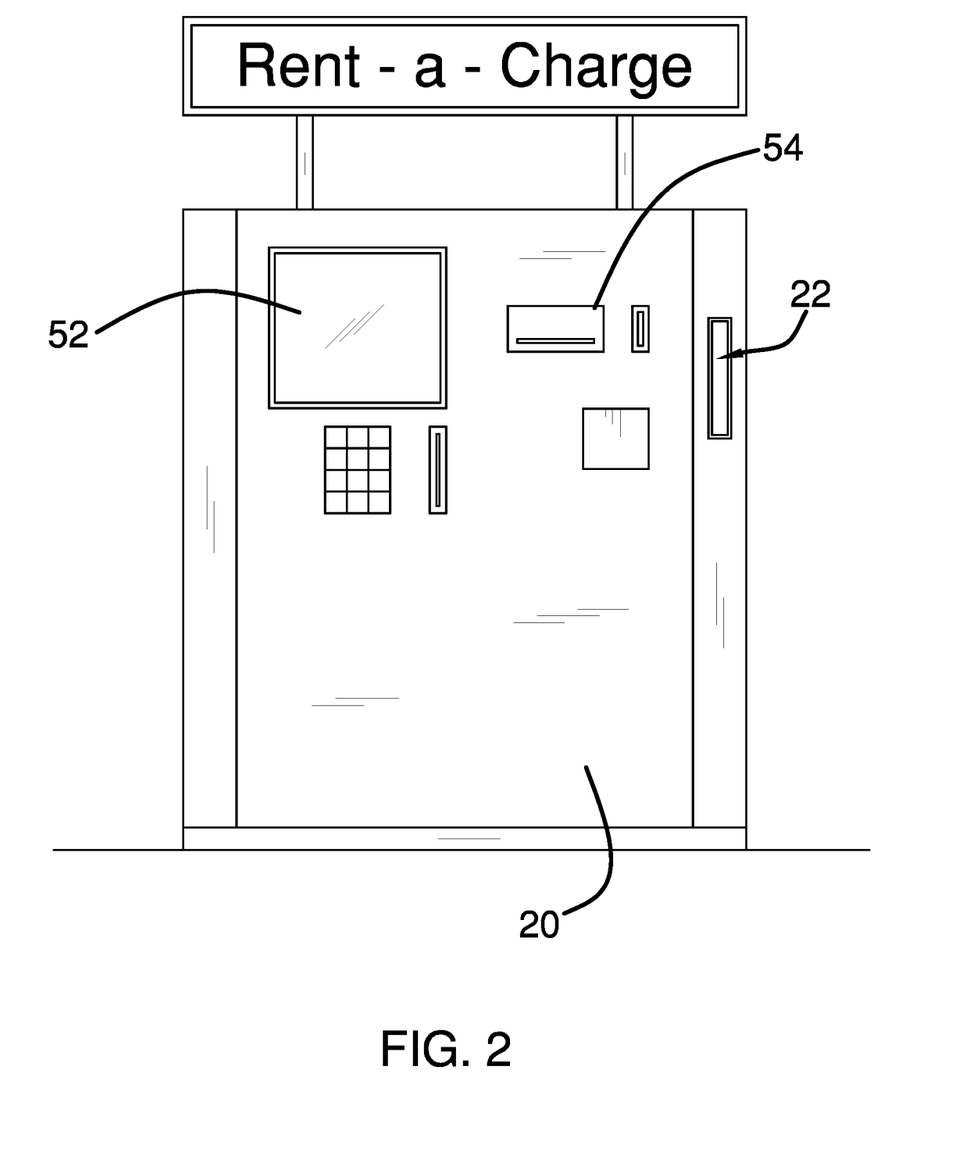
FIG. 2 is a front view of an embodiment of the disclosure.
Figure 3:
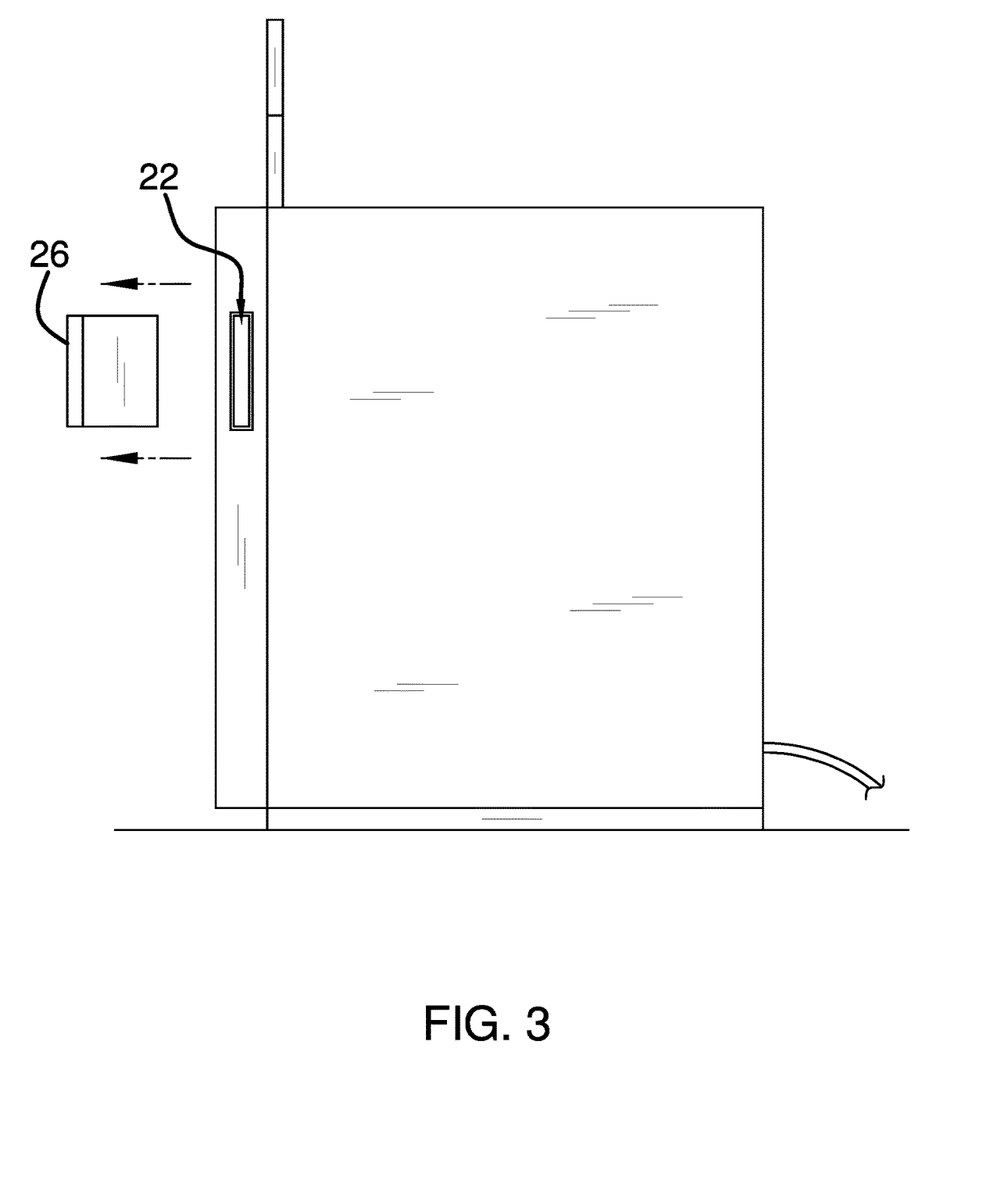
FIG. 3 is a left side view of an embodiment of the disclosure.
Figure 4:
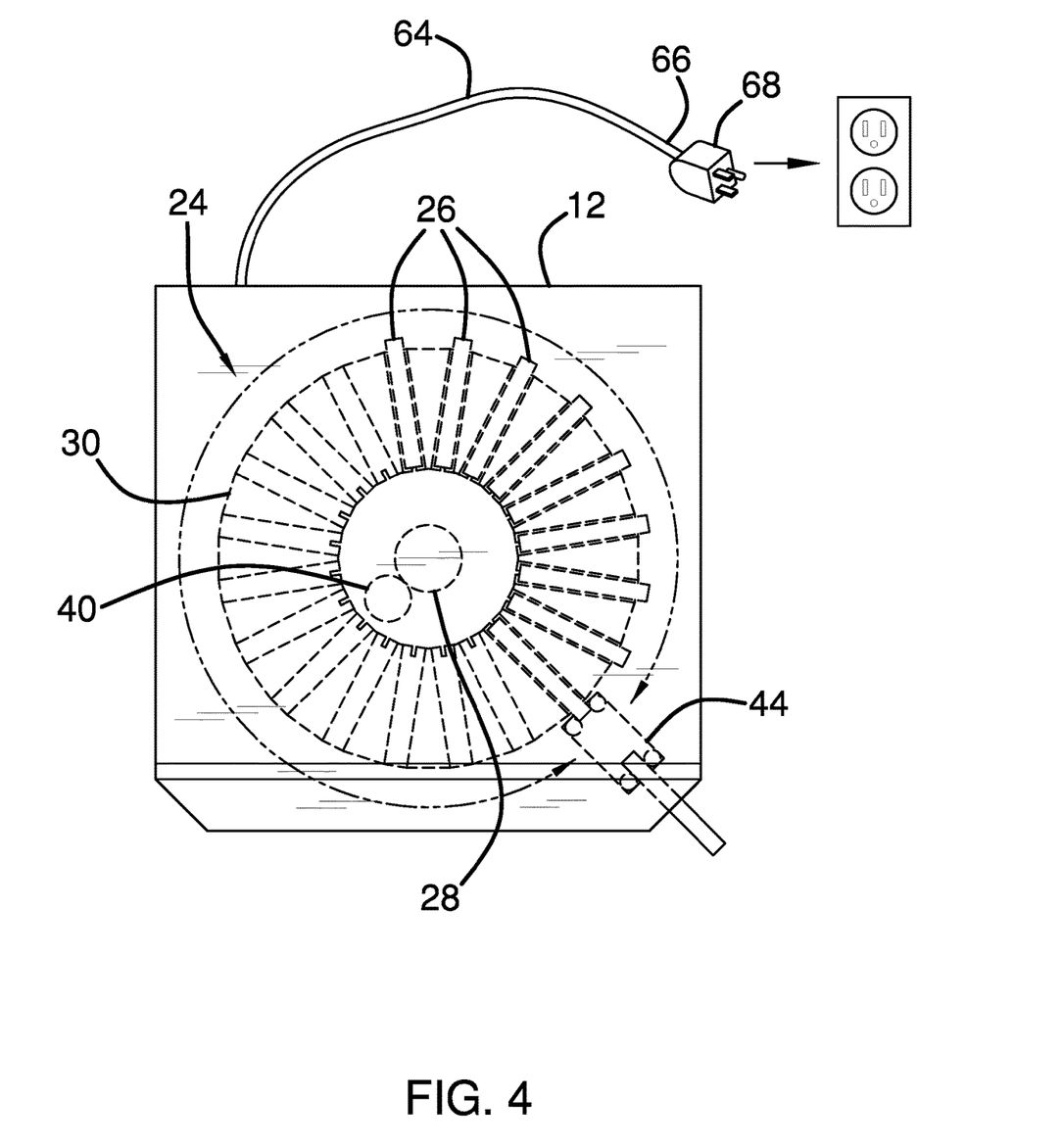
FIG. 4 is a top phantom view of an embodiment of the disclosure.
Figure 5:
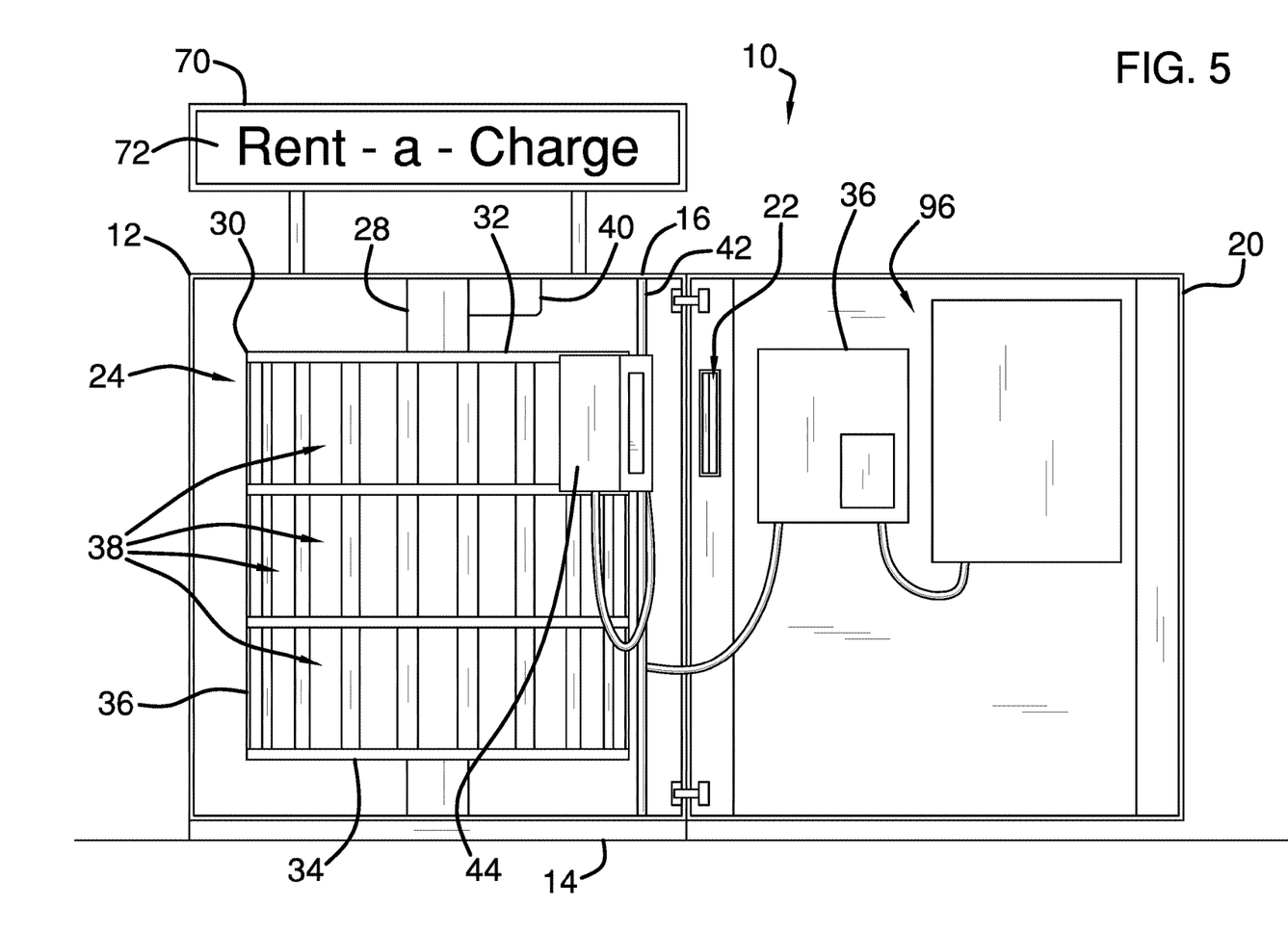
FIG. 5 is a front view of an embodiment of the disclosure showing a front side of a housing being open.
Figure 6:
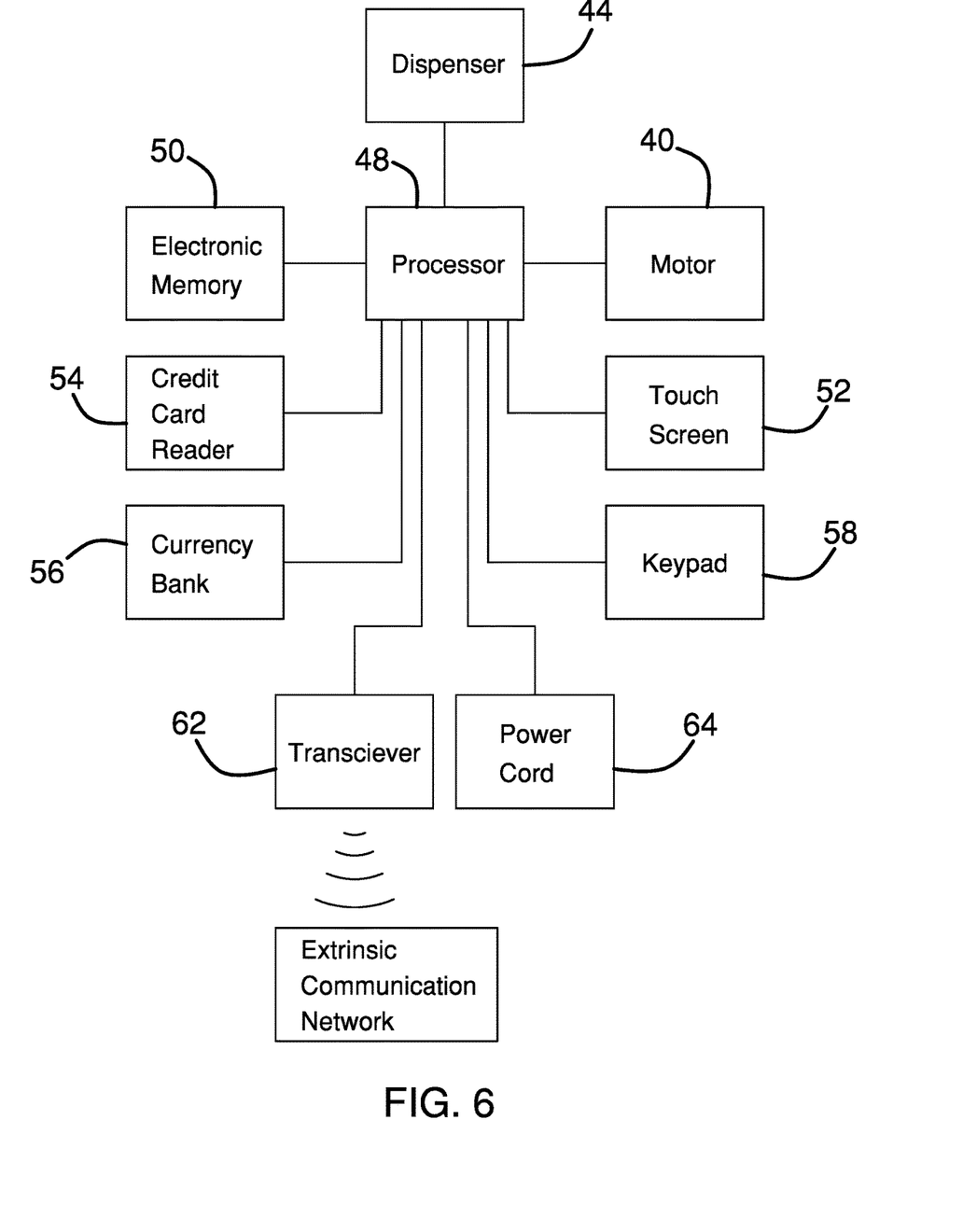
FIG. 6 is a schematic view of an embodiment of the disclosure.

With reference now to the drawings, and in particular to FIGS. 1 through 6 thereof, a new vending device embodying the principles and concepts of an embodiment of the disclosure and generally designated by the reference numeral 10 will be described.

As best illustrated in FIGS. 1 through 6, the charger vending assembly 10 generally comprises a housing 12 that is positioned on a support surface such as a floor or the like. Additionally, the housing 12 may be positioned in or proximate a retail environment. The housing 12 has a bottom wall 14, a top wall 16 and an outer wall 18 extending therebetween. The outer wall 18 has a front side 20 and the front side 20 has a vending slot 22 extending into an interior of the housing 12. Additionally, the front side 20 is hingedly coupled to the housing 12 such that an interior of the housing 12 is accessible when the front side 20 is opened.

A vending unit 24 is provided and the vending unit 24 is movably positioned within the housing 12. The vending unit 24 contains a plurality of chargers 26 and the vending unit 24 selectively dispenses a selected number of chargers 26 outwardly from the housing 12. In this way the selected number of chargers 26 is dispensed to a user to charge an electronic device. Each of the chargers 26 may be portable electronic device charger of any conventional design. Additionally, the electronic device may be a smart phone, a tablet computer, a laptop computer and any other battery powered, electronic device.

The vending unit 24 comprises a shaft 28 that is rotatably positioned within the housing 12. The shaft 28 extends between the top 16 and bottom 14 walls of the housing 12. A drum 30 is provided that has an upper end 32, a lower end 34 and an exterior wall 36 extending therebetween. The shaft 28 extends through the upper 32 and lower 34 ends such that the drum 30 is vertically oriented within the housing 12. Moreover, the drum 30 is coupled to the shaft 28 such that the drum 30 rotates with the shaft 28.

The exterior wall 36 of the drum 30 has a plurality of slots 38 each extending toward a center of the drum 30. The slots 38 are spaced apart from each other and are distributed around the exterior wall 36. Moreover, the slots 38 are arranged into a plurality of rows and columns between the upper end 32 and the lower end 34. Each of the plurality of chargers 26 is removably positioned in an associated one of the slots 38.

A motor 40 is positioned within the housing 12 and the motor 40 is mechanically coupled to the shaft 28 such that the motor 40 selectively rotates the drum 30 in the housing 12. The motor 40 may be an electric motor 40 or the like. Additionally, the motor 40 may be mechanically coupled to the shaft 28 via a belt and pulleys, a pair of complementary gears and any other conventional mechanical means.

A rod 42 is positioned within the housing 12 and the rod 42 extends between the top 16 and bottom 14 walls of the housing 12. The rod 42 is positioned between the exterior wall 36 of the drum 30 and the vending slot 22 in the housing 12. A dispenser 44 is provided and the dispenser 44 is movably coupled to the rod 42. The dispenser 44 selectively travels upwardly and downwardly along the rod 42 to be aligned with a selected one of the slots 38 in the drum 30. Moreover, the dispenser 44 selectively removes a selected one of the chargers 26 from the selected slot and urges the selected charger outwardly from the vending slot 22 in the housing 12. The dispenser 44 may be an electronically controlled, robotic dispenser 44 of any conventional design.

A control unit 46 is coupled to the housing 12 and the control unit 46 is selectively manipulated. The control unit 46 is electrically coupled to the vending unit 24 such that the control unit 46 controls operational parameters of the vending unit 24. Thus, the vending unit 24 dispenses the selected chargers 26 in accordance with commands from the control unit 46. The control unit 46 comprises a processor 48 that is coupled to the housing 12. The processor 48 is electrically coupled to the motor 40 and the dispenser 44 and the processor 48 selectively generates a vending sequence. Additionally, the processor 48 may be an electronic processor 48 or the like.

The motor 40 rotates the shaft 28 to align a selected one of the columns of the slots 38 with the rod 42 when the processor 48 generates the vending sequence. The dispenser 44 moves along the rod 42 to be aligned with a selected one of the slots 38 when the processor 48 generates the vending sequence. Additionally, the dispenser 44 urges the selected charger 26 outwardly from the vending slot 22 when the processor 48 generates the vending sequence. An electronic memory 50 is coupled to the housing 12 and the electronic memory 50 is electrically coupled to the processor 48. The electronic memory 50 stores data corresponding to the location of each of the slots 38 in the drum 30 and whether or not each of the slots 38 contains one of the chargers 26. Moreover, the electronic memory 50 may comprise RAM, a hard disk drive and any other electronic memory 50.

A touch screen 52 is coupled to the front side 20 of the housing 12 and the touch screen 52 is selectively manipulated. The touch screen 52 is electrically coupled to the processor 48 and the touch screen 52 displays indicia. The indicia comprise words relating to instructions for vending a selected charger. Moreover, the touch screen 52 may be a LCD touch screen 52 or the like.

A credit card reader 54 is coupled to the front side 20 of the housing 12 and the credit card reader 54 selectively reads a credit card. The credit card reader 54 is electrically coupled to the processor 48 to pay a fee associated with renting the selected chargers 26. Additionally, the credit card reader 54 may be an electronic credit card reader 54 of any conventional design. A currency bank 56 is coupled to the front side 20 of the housing 12 and the currency bank 56 is electrically coupled to the processor 48. The currency bank 56 selectively accepts paper currency and coin currency to pay the fee associated with renting the selected chargers 26. The currency bank 56 may include a dollar slot for accepting the paper currency, a coin slot for accepting the coin currency and a change pocket for dispensing change. Additionally, the currency bank 56 may be an electronic currency bank 56 of any conventional design.

A keypad 58 is coupled to the front side 20 and the keypad 58 is selectively manipulated. The keypad 58 is electrically coupled to the processor 48 and the keypad 58 includes a plurality of keys 60. Each of the keys 60 is selectively manipulated to control operational parameter of the processor 48. Additionally, the keys 60 may be manipulated to enter pin numbers and other information pertaining to the credit card reader 54. A transceiver 62 is coupled to the housing 12 and the transceiver 62 is electrically coupled to the processor 48. The transceiver 62 is in electrical communication with an extrinsic communication network to conduct the transaction with the credit card reader 54. Moreover, the transceiver 62 may be a radio frequency transceiver 62 or the like.

A power cord 64 is coupled to the housing 12 and the power cord 64 is electrically coupled to the processor 48. The power cord 64 has a distal end 66 with respect to the housing 12 and a plug 68 is electrically coupled to the distal end 66. The plug 68 is electrically coupled to a power source such as a female electrical outlet or the like. A sign 70 is coupled to the top wall 16 of the housing 12 and the sign 70 has a forward side 72. The forward side 72 has indicia is printed thereon and the indicia corresponding to the sign comprise words. Additionally, the words on the sign may be "Rent-A-Charge".

In use, a user approaches the housing 12 when the user needs to rent a charger 26. The user manipulates the touch screen 52 to order a selected number of the chargers 26 and the touch screen 52 displays the price of the number of chargers 26. The user pays the price with a credit card or monetary currency. Thus, the processor 48 generates the vending sequence and the dispenser 44 removes the selected chargers 26 from the drum 30 and urges the selected chargers 26 outwardly through the vending slot 22. In this way the user's electronic device may be charged when the user does not have access to an electrical outlet and other means of charging the user's electronic device. Additionally, the selected chargers 26 may be returned to the drum 30 through the vending slot 22 and the dispenser 44 positions the returned charger 26 back into the drum 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A charger vending assembly being configured to selectively rent a charger for an electronic device, said assembly comprising:
a housing being configured to be positioned on a support surface, said housing having a bottom wall, a top wall and an outer wall extending therebetween, said outer wall having a front side, said front side having a pair of angled lateral surfaces and a planar front face extending between said angled lateral surfaces;
a vending slot extending into an interior of said housing, said vending slot extending through one of said angled lateral surfaces;
a vending unit being movably positioned within said housing, said vending unit containing a plurality of chargers, said vending unit selectively dispensing a selected number of said chargers outwardly from said housing wherein said selected number of chargers is configured to charge an electronic device; and
a control unit being coupled to said housing wherein said control unit is configured to be manipulated, said control unit being electrically coupled to said vending unit such that said control unit controls operational parameters of said vending unit, said vending unit dispensing said selected chargers through said vending slot such that said selected chargers extend perpendicularly from said one of said angled lateral edges wherein said selected chargers dispensed through said vending slot are configured to be displayed to a user positioned in front of said housing without said housing being positioned directly behind said selected chargers.

2. The assembly according to claim 1, wherein said vending unit comprises a shaft being rotatably positioned within said housing, said shaft extending between said top and bottom walls of said housing.

3. The assembly according to claim 2, further comprising a drum having an upper end, a lower end and an exterior wall extending therebetween, said shaft extending through said upper and lower ends such that said drum is vertically oriented within said housing, said exterior wall having a plurality of slots each extending toward a center of said drum, said slots being spaced apart from each other and being distributed around said exterior wall, said slots being arranged into a plurality of rows and columns between said upper end and said lower end, each of said plurality of chargers being removably positioned in an associated one of said slots.

4. The assembly according to claim 3, further comprising a motor being positioned within said housing, said motor being mechanically coupled to said shaft such that said motor selectively rotates said drum in said housing.

5. The assembly according to claim 3, further comprising a rod being positioned within said housing, said rod extending between said top and bottom walls of said housing, said rod being positioned between said exterior wall of said drum and said vending slot in said housing.

6. The assembly according to claim 5, further comprising a dispenser being movably coupled to said rod, said dispenser selectively travelling upwardly and downwardly along said rod to be aligned with a selected one of said slots in said drum, said dispenser selectively removing a selected one of said chargers from said selected slot and urging said selected charger outwardly from said vending slot in said housing.

7. The assembly according to claim 6, wherein:
said vending unit includes a motor; and
said control unit comprises a processor being coupled to said housing, said processor being electrically coupled to said motor and said dispenser, said processor selectively generating a vending sequence, said motor rotating said drum to align a selected one of said columns of said slots with said rod when said processor generates said vending sequence, said dispenser moving along said rod to be aligned with a selected one of said slots when said processor generates said vending sequence, said dispenser urging said selected charger outwardly from said vending slot when said processor generates said vending sequence.

8. The assembly according to claim 7, further comprising an electronic memory being coupled to said housing, said electronic memory being electrically coupled to said processor, said electronic memory storing data corresponding to the location of each of said slots in said drum and whether or not each of said slots contains one of said chargers.

9. The assembly according to claim 7, further comprising a touch screen being coupled to said front side of said housing wherein said touch screen is configured to be manipulated, said touch screen being electrically coupled to said processor, said touch screen displaying indicia, said indicia comprising words relating to instructions for vending a selected charger.

10. The assembly according to claim 7, further comprising a keypad being coupled to said front side wherein said keypad is configured to be manipulated, said keypad being electrically coupled to said processor, said keypad including a plurality of keys, each of said keys being selectively manipulated to control operational parameter of said processor.

11. The assembly according to claim 7, further comprising a credit card reader being coupled to said front side of said housing wherein said credit card reader is configured to read a credit card, said credit card reader being electrically coupled to said processor to pay a fee associated with renting said selected chargers.

12. The assembly according to claim 7, further comprising a currency bank being coupled to said front side of said housing, said currency bank being electrically coupled to said processor, said currency bank selectively accepting paper currency and coin currency to pay the fee associated with renting said selected chargers.

13. The assembly according to claim 7, further comprising a power cord being coupled to said housing, said power cord being electrically coupled to said processor, said power cord having a distal end with respect to said housing, said distal end having a plug being electrically coupled thereto, said plug being configured to be electrically coupled to a power source.

14. The assembly according to claim 1, further comprising a sign being coupled to said top wall of said housing, said sign having a forward side, said forward side having indicia being printed thereon, said indicia corresponding to said sign comprising words.

15. A charger vending assembly being configured to selectively rent a charger for an electronic device, said assembly comprising:
a housing being configured to be positioned on a support surface, said housing having a bottom wall, a top wall and an outer wall extending therebetween, said outer wall having a front side, said front side having a pair of angled lateral surfaces and a planar front face extending between said angled lateral surfaces;

a vending slot extending into an interior of said housing, said vending slot extending through one of said angled lateral surfaces;

a vending unit being movably positioned within said housing, said vending unit containing a plurality of chargers, said vending unit selectively dispensing a selected number of said chargers outwardly from said housing wherein said selected number of chargers is configured to charge an electronic device, said vending unit comprising:

a shaft being rotatably positioned within said housing, said shaft extending between said top and bottom walls of said housing, a drum having an upper end, a lower end and an exterior wall extending therebetween, said shaft extending through said upper and lower ends such that said drum is vertically oriented within said housing, said exterior wall having a plurality of slots each extending toward a center of said drum, said slots being spaced apart from each other and being distributed around said exterior wall, said slots being arranged into a plurality of rows and columns between said upper end and said lower end, each of said plurality of chargers being removably positioned in an associated one of said slots, a motor being positioned within said housing, said motor being mechanically coupled to said shaft such that said motor selectively rotates said drum in said housing, a rod being positioned within said housing, said rod extending between said top and bottom walls of said housing, said rod being positioned between said exterior wall of said drum and said vending slot in said housing, a dispenser being movably coupled to said rod, said dispenser selectively travelling upwardly and downwardly along said rod to be aligned with a selected one of said slots in said drum, said dispenser selectively removing a selected one of said chargers from said selected slot and urging said selected charger outwardly from said vending slot in said housing; and a control unit being coupled to said housing wherein said control unit is configured to be manipulated, said control unit being electrically coupled to said vending unit such that said control unit controls operational parameters of said vending unit, said vending unit dispensing said selected chargers through said vending slot such that said selected chargers extend perpendicularly from said one of said angled lateral edges wherein said selected chargers dispensed through said vending slot are configured to be displayed to a user positioned in front of said housing without said housing being positioned directly behind said selected chargers, said control unit comprising:

a processor being coupled to said housing, said processor being electrically coupled to said motor and said dispenser, said processor selectively generating a vending sequence, said motor rotating said drum to align a selected one of said columns of said slots with said rod when said processor generates said vending sequence, said dispenser moving along said rod to be aligned with a selected one of said slots when said processor generates said vending sequence, said dispenser urging said selected charger outwardly from said vending slot when said processor generates said vending sequence, an electronic memory being coupled to said housing, said electronic memory being electrically coupled to said processor, said electronic memory storing data corresponding to the location of each of said slots in said drum and whether or not each of said slots contains one of said chargers, a touch screen being coupled to said front side of said housing wherein said touch screen is configured to be manipulated, said touch screen being electrically coupled to said processor, said touch screen displaying indicia, said indicia comprising words relating to instructions for vending a selected charger, a keypad being coupled to said front side wherein said keypad is configured to be manipulated, said keypad being electrically coupled to said processor, said keypad including a plurality of keys, each of said keys being selectively manipulated to control operational parameter of said processor, a credit card reader being coupled to said front side of said housing wherein said credit card reader is configured to read a credit card, said credit card reader being electrically coupled to said processor to pay a fee associated with renting said selected chargers, a currency bank being coupled to said front side of said housing, said currency bank being electrically coupled to said processor, said currency bank selectively accepting paper currency and coin currency to pay the fee associated with renting said selected chargers, and a power cord being coupled to said housing, said power cord being electrically coupled to said processor, said power cord having a distal end with respect to said housing, said distal end having a plug being electrically coupled thereto, said plug being configured to be electrically coupled to a power source; and a sign being coupled to said top wall of said housing, said sign having a forward side, said forward side having indicia being printed thereon, said indicia corresponding to said sign comprising words.

* * * * *